United States Patent
Yao et al.

(10) Patent No.: US 10,943,083 B2
(45) Date of Patent: Mar. 9, 2021

(54) FINGERPRINT IDENTIFICATION APPARATUS AND METHOD AND TERMINAL DEVICE

(71) Applicant: SHENZHEN GOODIX TECHNOLOGY CO., LTD., Shenzhen (CN)

(72) Inventors: Guofeng Yao, Shenzhen (CN); Jian Shen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/412,298

(22) Filed: May 14, 2019

(65) Prior Publication Data

US 2020/0097696 A1    Mar. 26, 2020

Related U.S. Application Data

(63) Continuation of application No. PCT/CN2018/107309, filed on Sep. 25, 2018.

(51) Int. Cl.
*G06K 9/00* (2006.01)

(52) U.S. Cl.
CPC ....... *G06K 9/0004* (2013.01); *G06K 9/00087* (2013.01)

(58) Field of Classification Search
CPC ............. G06K 9/0004; G06K 9/00087; G06K 9/00006–0012
See application file for complete search history.

(56) References Cited

U.S. PATENT DOCUMENTS

| 7,634,116 | B2 | 12/2009 | Sato |
| 8,284,019 | B2 | 10/2012 | Pishva |
| 10,019,615 | B2 | 7/2018 | Wu |
| 10,043,086 | B2 | 8/2018 | Zhou et al. |
| 2002/0076089 | A1 | 6/2002 | Muramatsu et al. |
| 2007/0014437 | A1 | 1/2007 | Sato |
| 2009/0046903 | A1 | 2/2009 | Corcoran et al. |
| 2015/0177884 | A1* | 6/2015 | Han ............. G06F 3/0412 345/174 |
| 2016/0266695 | A1 | 9/2016 | Bae et al. |

(Continued)

FOREIGN PATENT DOCUMENTS

| CN | 1879127 A | 12/2006 |
| CN | 101083274 A | 12/2007 |

(Continued)

*Primary Examiner* — Stephen G Sherman

(57) ABSTRACT

Provided are an apparatus and a method of fingerprint identification and a terminal device, the fingerprint identification apparatus including: an optical sensor including a pixel array, the pixel array includes a plurality of first type of pixel points and at least one second type of pixel point, the plurality of first type of pixel points and the at least one second type of pixel point are configured to receive optical signals from an object; a color filter layer or a polarizer plate disposed above the at least one second type of pixel point; an intensity of an optical signal received by the at least one second type of pixel point and an intensity of an optical signal received by at least one first type of pixel point adjacent to the at least one second type of pixel point are used to determine whether the object is a real finger.

17 Claims, 4 Drawing Sheets

(56) References Cited

U.S. PATENT DOCUMENTS

| | | |
|---|---|---|
| 2016/0320234 A1 | 11/2016 | Zhou et al. |
| 2018/0018494 A1 | 1/2018 | Wu |
| 2018/0018496 A1 | 1/2018 | Hung et al. |
| 2018/0018500 A1 | 1/2018 | Wu |
| 2018/0025202 A1* | 1/2018 | Ryshtun ............. G06K 9/00114 382/124 |
| 2018/0129798 A1 | 5/2018 | He et al. |
| 2019/0377858 A1 | 12/2019 | He et al. |

FOREIGN PATENT DOCUMENTS

| | | | |
|---|---|---|---|
| CN | 101594491 | A | 12/2009 |
| CN | 101641049 | A | 2/2010 |
| CN | 101843020 | B | 5/2014 |
| CN | 104794453 | A | 7/2015 |
| CN | 105844212 | A | 8/2016 |
| CN | 106919887 | A | 7/2017 |
| CN | 206515839 | U | 9/2017 |
| CN | 107622224 | A | 1/2018 |
| CN | 107820617 | A | 3/2018 |
| CN | 108235814 | A | 6/2018 |
| CN | 207557977 | U | 6/2018 |
| CN | 109255285 | A | 1/2019 |
| CN | 209168144 | U | 7/2019 |
| CN | 210142330 | U | 3/2020 |

\* cited by examiner

FINGERPRINT IDENTIFICATION APPARATUS AND METHOD AND TERMINAL DEVICE

CROSS-REFERENCE TO RELATED APPLICATIONS

The present application is a continuation of international application No. PCT/CN2018/107309, filed on Sep. 25, 2018, which is hereby incorporated by reference in its entirety.

TECHNICAL FIELD

The present application relates to the field of optical fingerprint technologies, and more particularly, to a fingerprint identification apparatus, a method of fingerprint identification and a terminal device.

BACKGROUND

The application of an optical fingerprint identification apparatus brings safe and convenient user experience to a user, however, a forged fingerprint such as a fingerprint mold made of an artificial material (for example, silica gel, white glue) and a printed fingerprint image is a potential safety hazard in fingerprint application. Therefore, how to identify authenticity of a fingerprint captured by an optical fingerprint identification apparatus to improve security of fingerprint identification is an urgent problem to be solved.

SUMMARY

Embodiments of the present application provide a fingerprint identification apparatus, a method of fingerprint identification and a terminal device, which can identify authenticity of a fingerprint, thereby improving security of fingerprint identification.

In a first aspect, provided is a fingerprint identification apparatus, including:

an optical sensor including a pixel array, where the pixel array includes a plurality of first type of pixel points and at least one second type of pixel point, and the plurality of first type of pixel points and the at least one second type of pixel point are configured to receive optical signals from an object;

a color filter layer or a polarizer plate disposed above the at least one second type of pixel point; and a processor configured to determine whether the object is a real finger according to an intensity of an optical signal received by each second type of pixel point and an intensity of an optical signal received by at least one first type of pixel point adjacent to the each second type of pixel point.

Optionally, the color filter layer is a color filter material, and a wave band range of the color filter material only includes a part of a wave band range of an optical signal for fingerprint identification.

Optionally, the color filter material is a green filter material, a blue filter material or a red filter material.

Optionally, the optical signals received by the second type of pixel point and the adjacent first type of pixel point are from a fingerprint ridge or from a fingerprint valley.

Optionally, a light transmissive material is arranged above the plurality of first type of pixel points.

Optionally, the processor is further configured to: determine a relative light intensity of the each second type of pixel point according to the intensity of the optical signal received by the each second type of pixel point and the intensity of the optical signal received by the at least one adjacent first type of pixel point; and determine whether the object is a real finger according to the relative light intensity of the each second type of pixel point and a relative light intensity range.

Optionally, the processor is specifically configured to: determine at least one ratio of the intensity of the optical signal received by the each second type of pixel point to the intensity of the optical signal received by the at least one adjacent first type of pixel point as the relative light intensity of the each second type of pixel point.

Optionally, the processor is further configured to: determine a number of second type of pixel points of which relative light intensities are within the relative light intensity range; and determine whether the object is a real finger according to the number.

Optionally, the processor is further configured to: determine that the object is a real finger if the number is greater than or equal to a specific number threshold, or a ratio of the number to a total number of the second type of pixel points is greater than or equal to a specific ratio threshold; or determine that the object is a fake finger if the number is less than the specific number threshold, or the ratio of the number to the total number of the second type of pixel points is less than the specific ratio threshold.

Optionally, the processor is further configured to: determine the specific ratio threshold or the specific number threshold according to a security level of an operation of triggering fingerprint identification and a first correspondence relationship, where the first correspondence relationship is a correspondence relationship between a security level and a ratio threshold or a specific number threshold.

Optionally, in the first correspondence relationship, a first security level corresponds to a first ratio threshold or a first number threshold, and a second security level corresponds to a second ratio threshold or a second number threshold, where the first security level is higher than the second security level, the first ratio threshold is greater than the second ratio threshold, and the first number threshold is greater than the second number threshold.

Optionally, the processor is further configured to: determine the relative light intensity range according to a security level of an operation of triggering the fingerprint identification and a second correspondence relationship, where the second correspondence relationship is a correspondence relationship between a security level and a relative light intensity range.

Optionally, in the second correspondence relationship, a first security level corresponds to a first light intensity range, and a second security level corresponds to a second light intensity range, where the first security level is higher than the second security level, a difference value between an upper limit and a lower limit of the first light intensity range is less than a difference value between an upper limit and a lower limit of the second light intensity range.

Optionally, the processor is further configured to: determine the relative light intensity range according to a finger position where the optical signal received by the second type of pixel point comes from, where a fingerprint ridge and a fingerprint valley respectively correspond to different relative light intensity ranges.

Optionally, the processor is further configured to: determine the relative light intensity range according to intensities of optical signals from a real finger that are collected multiple times by the plurality of first type of pixel points and the at least one second type of pixel point.

Optionally, the processor is further configured to: determine that fingerprint authentication is successful in a case that fingerprint information of the object matches pre-stored fingerprint information of the object and the object is a real finger.

Optionally, the fingerprint identification apparatus further includes: an optical component disposed above the pixel array and configured to direct an optical signal reflected from a surface of the object to the pixel array.

Optionally, the optical component includes a filter layer and a light directing layer, where the filter layer is configured to filter ambient light entering the pixel array, and the light directing layer is configured to direct the optical signal reflected from the surface of the object to the pixel array.

Optionally, the light directing layer includes at least one of the followings: a lens, a collimator, and a pin-hole.

Optionally, the at least one second type of pixel point is disposed at a central position of the pixel array in a cross shape, a rectangular shape or an asterisk shape.

In a second aspect, provided a method of fingerprint identification, applied to a fingerprint identification apparatus including an optical sensor, where a pixel array included in the optical sensor includes a plurality of first type of pixel points and at least one second type of pixel point, a color filter layer or a polarizer plate is disposed above the at least one second type of pixel point, and the method includes: acquiring optical signals from an object that are received by the plurality of first type of pixel points and the at least one second type of pixel point; and determining whether the object is a real finger according to an intensity of an optical signal received by each second type of pixel point and an intensity of an optical signal received by at least one first type of pixel point adjacent to the each second type of pixel point.

Optionally, the determining whether the object is a real finger according to the intensity of the optical signal received by the each second type of pixel point and the intensity of the optical signal received by the at least one first type of pixel point adjacent to the each second type of pixel point, includes: determining a relative light intensity of the each second type of pixel point according to the intensity of the optical signal received by the each second type of pixel point and the intensity of the optical signal received by the at least one adjacent first type of pixel point; and determining whether the object is a real finger according to the relative light intensity of the each second type of pixel point and a relative light intensity range.

Optionally, the determining the relative light intensity of the each second type of pixel point according to the intensity of the optical signal received by the each second type of pixel point and the intensity of the optical signal received by the at least one adjacent first type of pixel point, includes: determining at least one ratio of the intensity of the optical signal received by the each second type of pixel point to the intensity of the optical signal received by the at least one adjacent first type of pixel point as the relative light intensity of the each second type of pixel point.

Optionally, the determining whether the object is a real finger according to the relative light intensity of the each second type of pixel point and the relative light intensity range, includes: determining a number of second type of pixel points of which relative light intensities are within the relative light intensity range; and determining whether the object is a real finger according to the number.

Optionally, the determining whether the object is a real finger according to the number, includes:

determining that the object is a real finger if the number is greater than or equal to a specific number threshold, or a ratio of the number to a total number of the second type of pixel points is greater than or equal to a specific ratio threshold; or determining that the object is a fake finger if the number is less than the specific number threshold, or the ratio of the number to the total number of the second type of pixel points is less than the specific ratio threshold.

Optionally, the method further includes: determining the specific ratio threshold or the specific number threshold according to a security level of an operation of triggering fingerprint identification and a first correspondence relationship, where the first correspondence relationship is a correspondence relationship between a security level and a ratio threshold or a specific number threshold.

Optionally, in the first correspondence relationship, a first security level corresponds to a first ratio threshold or a first number threshold, and a second security level corresponds to a second ratio threshold or a second number threshold, where the first security level is higher than the second security level, the first ratio threshold is greater than the second ratio threshold, and the first number threshold is greater than the second number threshold.

Optionally, the method further includes: determining the relative light intensity range according to a security level of an operation of triggering fingerprint identification and a second correspondence relationship, where the second correspondence relationship is a correspondence relationship between a security level and a relative light intensity range.

Optionally, in the second correspondence relationship, a first security level corresponds to a first light intensity range, and a second security level corresponds to a second light intensity range, where the first security level is higher than the second security level, a difference value between an upper limit and a lower limit of the first light intensity range is less than a difference value between an upper limit and a lower limit of the second light intensity range.

Optionally, the optical signals received by the second type of pixel point and the adjacent first type of pixel point are from a fingerprint ridge or from a fingerprint valley.

Optionally, the method further includes: determining the relative light intensity range according to a finger position where the optical signal received by the second type of pixel point comes from, where a fingerprint ridge and a fingerprint valley respectively correspond to different relative light intensity ranges.

Optionally, the method further includes: determining the relative light intensity range according to intensities of optical signals from a real finger that are collected multiple times by the plurality of first type of pixel points and the at least one second type of pixel point.

Optionally, the method further includes: determining that fingerprint authentication is successful in a case that fingerprint information of the object matches pre-stored fingerprint information of the object and the object is a real finger.

In a third aspect, provided is a chip, the chip including an input/output interface, at least one processor, at least one memory and a bus, where the at least one memory is configured to store instructions, the at least one processor is configured to call the instructions in the at least one memory to execute the method according to the second aspect or any possible implementation of the second aspect.

In a fourth aspect, provided is a terminal device, including the fingerprint identification apparatus according to the first aspect or any possible implementation of the first aspect.

Optionally, the terminal device further includes: a display screen disposed above the fingerprint identification apparatus.

In a fifth aspect, provided is a terminal device, including a fingerprint identification apparatus and a processor. The processor and the fingerprint identification apparatus communicate with each other through an internal connection circuit, and transfer control and/or data signals, such that the terminal device executes the method according to the foregoing second aspect or any possible implementation of the second aspect.

In a sixth aspect, provided is a computer readable medium, configured to store a computer program, where the computer program includes instructions used to execute the method according to the foregoing second aspect or any possible implementation of the second aspect.

In a seventh aspect, provided is a computer program product including instructions, where when a computer runs the instructions of the computer program product, the computer executes the method of fingerprint identification according to the forgoing second aspect or any possible implementation of the second aspect.

Particularly, the computer program product may run on the terminal device according to the foregoing fifth aspect.

Based on the foregoing technical solutions, by disposing a certain number of second type of pixel points in a pixel array of a fingerprint identification apparatus, intensities of optical signals are detected by a second type of pixel points and a first type of pixel point, where the intensity of the optical signal detected by the second type of pixel point is less than the intensity of the optical signal detected by an adjacent first type of pixel point, and since a difference between the intensities is different for different materials, authenticity of a fingerprint can be determined according to the difference between the intensities of the optical signals detected by the second type of pixel point and the first type of pixel point, thereby improving security of fingerprint identification.

DESCRIPTION OF EMBODIMENTS

The technical solutions in embodiments of the present application will be described hereinafter in conjunction with the attached drawings.

It should be understood that, the embodiments of the present application may be applied to an optical fingerprint system, which includes but not limited to an optical fingerprint identification system and a medical diagnostic product based on optical fingerprint imaging; and the embodiments of the present application only take an optical fingerprint system as an example for description, which should not constitute any limit to the embodiments of the present application, and the embodiments of the present application are also applicable to other systems adopting optical imaging technologies and the like.

As a common application scene, an optical fingerprint system provided by the embodiments of the present application can be applied to a smart phone, a tablet computer and another mobile terminal having a display screen or another terminal device; and more particularly, in the foregoing terminal devices, a fingerprint identification apparatus may specifically be an optical fingerprint apparatus, which may be disposed in a partial area or an entire area below a display screen, thereby forming an under-display optical fingerprint system.

Figure 1:
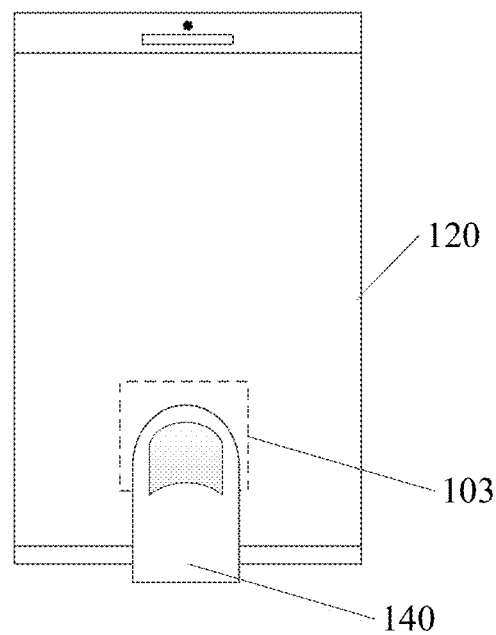
FIG. 1 is a schematic structural diagram of a terminal device applicable to an embodiment of the present application.
Figure 1:
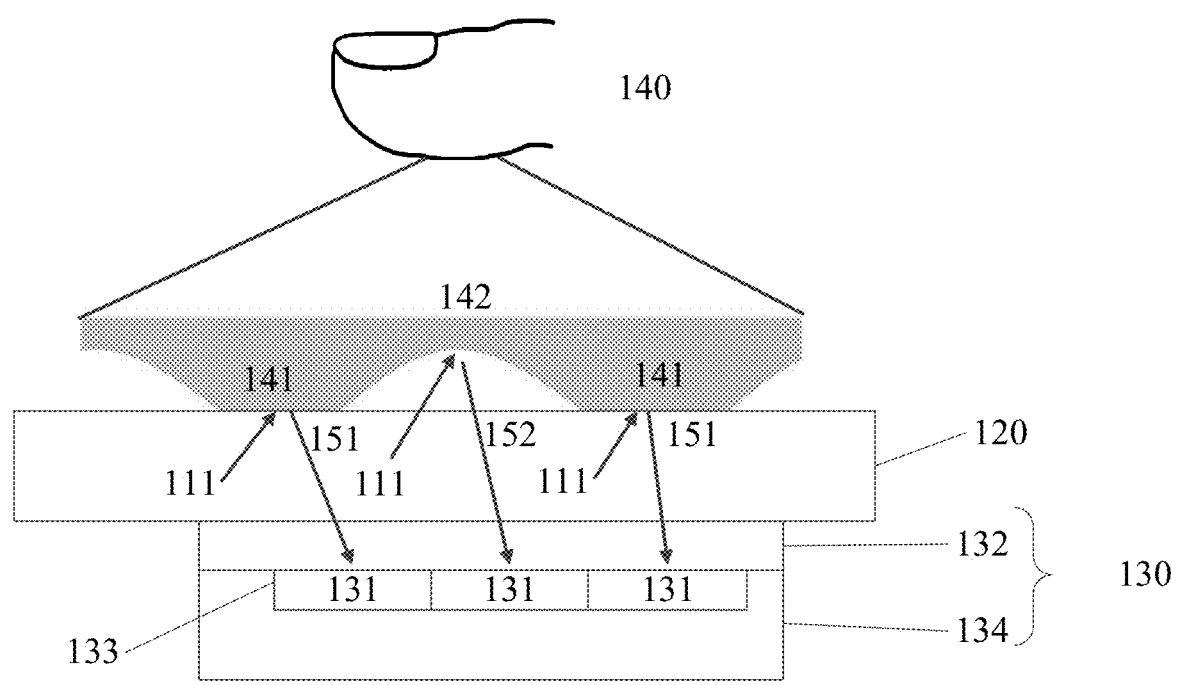

FIG. 1 illustrates a schematic structural diagram of a terminal device applicable to an embodiment of the present application. A terminal device 10 includes a display screen 120 and an optical fingerprint apparatus 130, where the optical fingerprint apparatus 130 is disposed in a partial area below the display screen 120. The optical fingerprint apparatus 130 includes a sensing array having a plurality of optical sensing units, and an area where the sensing array is located is a fingerprint detection area 103 of the optical fingerprint apparatus 130. As shown in FIG. 1, the fingerprint detection area 103 is located in a display area of the display screen 120, and thus when a user needs to unlock the terminal device or perform other fingerprint verification on the terminal device, fingerprint input can be implemented as long as a finger is pressed against the fingerprint detection area 103 located in the display screen 120. Since fingerprint detection can be implemented inside the screen, there is no need to reserve space for a front surface of the terminal device 10 in the foregoing structure to set a fingerprint button (such as Home button), so that a full screen scheme can be adopted, that is, the display area of the display screen 120 can be substantially extended to the entire front surface of the terminal device 10.

As an optional implementation, as shown in FIG. 1, the optical fingerprint apparatus 130 includes a light detection portion 134 and an optical component 132, where the light detection portion 134 includes the sensing array, a read circuit electrically connected with the sensing array and other auxiliary circuits, which can be made on a die by a semiconductor process; the sensing array is specifically a photo detector array including a plurality of photo detectors distributed in an array, and the photo detectors can be used as the optical sensing units as described above; and the optical component 132 may be disposed above the sensing array of the light detection portion 134, and may specifically include a filter layer, a light directing layer and other optical elements, the filter layer can be used to filter ambient light passing through a finger, and the light directing layer is mainly used to direct reflected light reflected back from a finger surface to the sensing array for optical detection.

In a specific implementation, the optical component 132 may be encapsulated with the light detection portion 134 in a same optical fingerprint module. The light directing layer may specifically be a collimator layer or a lens layer made on a semiconductor silicon wafer, the light directing layer has a plurality of collimating units or lens units, and the collimating units may specifically be small holes; and in the reflected light reflected from the finger, light that is incident perpendicularly to the collimating units can pass through and be received by the optical sensing units below the collimating units, while light that is obliquely incident is attenuated through multiple reflection inside the collimating units, and thus each optical sensing unit can only basically receive reflected light reflected from fingerprint lines right above it, so that the sensing array can detect a fingerprint image of the finger.

In the optical fingerprint apparatus 130, each collimating unit or lens unit may respectively correspond to one of the optical sensing units of the sensing array; alternatively, a non-one-to-one correspondence relationship may also be used between the collimator units or the lens units and the optical sensing units of the sensing array to reduce generation of Moire fringe interference, for example, one optical sensing unit may correspond to a plurality of collimating units or lens units, or the collimating units or the lens units may also adopt a manner of an irregular arrangement; and the collimating units or the lens units that adopt the irregular arrangement may correct reflected light detected by each sensing unit through a post-software algorithm.

As an optional embodiment, the display screen 120 may adopt a display screen with a self-emitting display unit, such as an organic light-emitting diode (OLED) display screen or a micro light-emitting diode (Micro-LED) display screen. Taking an OLED display screen as an example, the optical fingerprint apparatus 130 can use a display unit (that is, an OLED light source) of the OLED display screen 120 that is located in the fingerprint detection area 103 as an excitation light source for optical fingerprint detection. When a finger 140 is pressed against the fingerprint detection area 103, the display screen 120 emits a beam of light 111 to the object finger 140 above the fingerprint detection area 103, and the light 111 is reflected on a surface of the finger 140 to form reflected light. Since a ridge and a valley of a fingerprint have different light reflecting abilities, reflected light 151 from the ridge of the fingerprint and reflected light 152 from the valley of the fingerprint have different light intensities; after passing through the optical component 132, the reflected light is received by the light detection portion 134 in the optical fingerprint apparatus 130 and converted into a corresponding electrical signal, that is, a fingerprint detection signal; and fingerprint image data can be obtained based on the fingerprint detection signal, and fingerprint matching verification can be further performed, thereby implementing an optical fingerprint identification function at the terminal device 10.

In other alternative implementations, the display screen 120 may also adopt a non-self-emitting display screen, for example, a backlight liquid crystal display screen; in this case, the optical detection apparatus 130 cannot adopt the display unit of the display screen 120 as an excitation light source; therefore, there is a need to integrate an excitation light source inside the optical detection apparatus 130 or set an excitation light source outside the optical detection apparatus 130 to achieve optical fingerprint detection, and a detection principle thereof is consistent with the above described content.

It should be understood that, in a specific implementation, the terminal device 10 further includes a transparent protective cover, and the cover may be a glass cover or a sapphire cover, which is located above the display screen 120 and covers the front surface of the terminal device 10. Therefore, in the embodiment of the present application, the so-called finger being pressed against the display screen 120 actually refers to the finger being pressed against the cover above the display screen 120 or a surface of a protective layer covering the cover.

It should also be understood that, in addition to fingerprint identification, the technical solution of the embodiment of the present application can perform other biometric identification, such as palmprint identification or vein identification, which is not limited in the embodiment of the present application.

It should be noted that the optical fingerprint apparatus in the embodiment of the present application may also be referred to as an optical fingerprint identification module, a fingerprint identification apparatus, a fingerprint identification module, a fingerprint module, a fingerprint acquisition apparatus or the like, and the foregoing terms may be replaced with each other.

It should be understood that, influenced by factors of skin thickness, hemoglobin concentration, melanin content and the like of human skin tissue, reflection performance of human skin tissue to a specific wavelength of light is significantly different from that of an artificial material to a specific wavelength of light such as silica gel, paper and adhesive tape.

Based on this, an embodiment of the present application provides a fingerprint identification scheme, and a certain number of characteristic pixel points are disposed in a pixel array of a fingerprint identification apparatus, where for a same optical signal, an intensity of the optical signal detected by a characteristic pixel point is less than an intensity of the optical signal detected by an adjacent common pixel point, the intensities of the optical signal are detected by the characteristic pixel point and the common pixel point, and since a difference between the intensities is different for different materials, authenticity of a fingerprint can be determined according to the difference between the intensities of the optical signal detected by the characteristic pixel point and the common pixel point, that is, whether the fingerprint is from a live finger, in other word, the fingerprint identification scheme of the embodiment of the present application can be used for live body detection.

A fingerprint identification apparatus according to an embodiment of the present application will be described in detail hereinafter in conjunction with to FIGS. 2 to 3.

It should be noted that, in embodiment shown below, the same structures are denoted by the same reference numbers for ease of understanding, and detailed description of the same structure is omitted for brevity.

It should be understood that the size, height, thickness or the like of various structures in the embodiments of the present application shown below are merely illustrative and should not constitute any limit to the present application.

Figure 2:
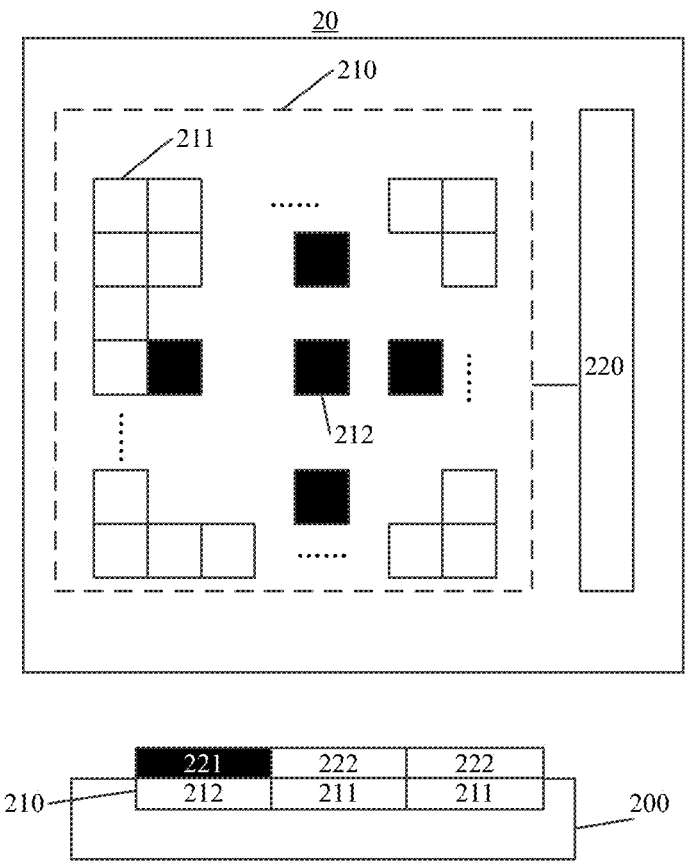
FIG. 2 is a schematic structural diagram of a fingerprint identification apparatus according to an embodiment of the present application.
Figure 3:
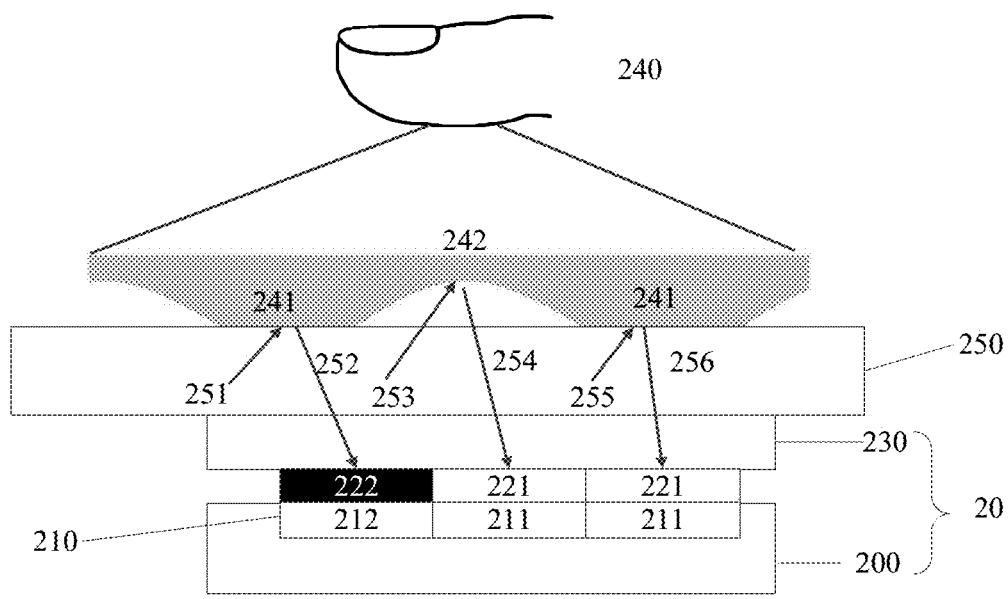
FIG. 3 is a sectional view of a fingerprint identification apparatus according to an embodiment of the present application.

FIG. 2 is a schematic structural diagram of a fingerprint identification apparatus 20 provided by an embodiment of the present application, and the fingerprint identification apparatus 20 includes: an optical sensor 200 and a processor 220. The optical sensor 200 includes a pixel array 210, the pixel array 210 includes a plurality of first type of pixel points 211 and at least one second type of pixel point 212, and a color filter layer or a polarizer plate 221 is disposed above the at least one second type of pixel point.

It should be understood that, in the embodiment of the present application, the optical sensor 200 may be the light detection portion 134 in FIG. 1, or be referred to as a fingerprint sensor.

Optionally, in the embodiment of the present application, the fingerprint identification apparatus 20 may further include an optical component 230, and the optical component 230 may correspond to the optical component 132 in FIG. 1.

It should be understood that the first type of pixel points in the embodiment of the present application may be referred to as common pixel points, and an arrangement thereof may be the same as an arrangement of pixel points in an existing pixel array, the second type of pixel point may be referred to as a characteristic pixel point configured to determine authenticity of a fingerprint, an arrangement of the second type of pixel point is different from an arrangement of an existing pixel point, and a material or structure that can reduce an intensity of an optical signal entering the characteristic pixel point is disposed above the second type of pixel point, such as a color filter layer or a polarizer plate.

It should be noted that positions, numbers, and distributions of the first type of pixel points 211 and the second type of pixel point 212 in FIG. 2 are only exemplary, which should not constitute any limit to the embodiment of the present application, and adjustment can be performed in the present application according to actual requirements.

In some optional arrangements, the second type of pixel point 212 may be disposed at a central position of the pixel array 210 in a cross shape, a rectangular shape or an asterisk shape.

In the embodiment of the present application, the color filter layer 221 can play a role in filtering an optical signal, and it only allows an optical signal within a specific wave band range to pass; for example, the color filter layer 221 may be a green filter material that only allows an optical signal at a green light wave band to pass, and in this way, after the optical signal passes through the color filter layer 221, the wave band of the optical signal is narrowed, and an overall light intensity is reduced, that is, the intensity of the optical signal entering the second type of pixel point is reduced. The polarizer plate can be configured to change a polarization direction of an optical signal, and thus it can also serve a purpose of reducing an intensity of an optical signal entering the second type of pixel point.

It should be understood that, in the embodiment of the present application, another structure may also be disposed above the second type of pixel point, or another material may be coated on the second type of pixel point as long as the purpose of reducing an intensity of an optical signal entering the second type of pixel point can be achieved, which is not limited in the embodiment of the present application. Hereinafter, as an example, the color filter layer 221 is disposed above the second type of pixel point 212, which should not constitute any limit to the present application.

It should be noted that, in the embodiment of the present application, it is required that a wave band of emitted light of a light source for fingerprint detection includes a wave band of the color filter material and at least a part of other wave bands except said wave band, that is, the wave band of the color filter material only includes a part of wave bands of the emitted light. Thus, reflected light enters the color filter layer after reflection on a surface of an object, and part of the reflected light is filtered after passing through the color filter layer, while part of the reflected light is allowed to pass to determine a relative light intensity of the second type of pixel point.

For example, if the light source emits white light, the color filter material may be a green filter material that only allows a green light wave band to pass, or may be a blue filter material that only allows a blue light wave band to pass, or may be a cyan filter material that allows both a green light wave band and a blue light wave band to pass, or the like, as long as the color filter material can filter light signals at part of wave bands while allowing light signals at other wave bands to pass, and this is not limited in the embodiment of the present application.

Optionally, in the embodiment of the present application, the light source for fingerprint detection may be a self-light-emitting light source of a display screen, or may be an excitation light source integrated inside the fingerprint identification apparatus or another external excitation light source, which is not limited in the embodiment of the present application.

Optionally, in some embodiments, a light transmissive material 222 may be arranged above the first type of pixel points 211 to prevent an intensity of an optical signal entering the first type of pixel points 211 from being affected or less affected. Alternatively, in other embodiments, no light transmissive material may be arranged above the first type of pixel points 211, that is, there may be air between the first type of pixel points and the optical component 230 above the first type of pixel points.

Then, optical signals reflected from an object surface reach the first type of pixel points 211 and the second type of pixel point 212 respectively after passing through the light transmissive material 222 and the color filter layer 221; due to different optical properties of the light transmissive material 222 and the color filter layer 221, there is a certain difference between intensities of reflected light detected by the second type of pixel point 212 and an adjacent first type of pixel point 211; the difference between the intensities is significantly different for different materials (such as, skin tissue and artificial materials), therefore, based on the difference between the intensities, whether a fingerprint image collected by the fingerprint identification apparatus is from a real finger can be determined.

It should be understood that, in the embodiment of the present application, a first type of pixel point 211 adjacent to the second type of pixel point 212 may include at least one of the first type of pixel points located above, below, to the left of, or to the right of the second type of pixel point 212, or a first type of pixel point 211 within a circle may also be determined as the first type of pixel point adjacent to the second type of pixel point 212, where the circle is centered on the second type of pixel point 212 and with a specific radius, or the adjacent first type of pixel point may also be determined in other manners, which is not limited in the embodiment of the present application.

It should be noted that the second type of pixel point and the first type of pixel point adjacent to the second type of pixel point are the same genre of pixel points, and the same genre of pixel points in this paper may refer to that optical signals received by the second type of pixel point and the adjacent first type of pixel point are from a fingerprint ridge or from a fingerprint valley, that is, the types of fingerprint positions where the received optical signals thereof come from are the same.

To sum up, a main difference between the second type of pixel point and the adjacent first type of pixel point lies in a difference of filter materials disposed above them, that is, what is disposed above the second type of pixel point is a color filter layer or a polarizer plate, while what is disposed above the first type of pixel point is a light transmissive material or no material is disposed above the first type of pixel point; however, characteristics in other aspects are substantially the same, for example, collected optical signals are from a fingerprint ridge or from a fingerprint valley; their positions are adjacent to each other in the pixel array, and thus it can be considered that the environment where they are located is the same or similar; in other words, an environment factor has the same or similar effect on the collected optical signals, and then, calculation of a ratio of an intensity of an optical signal received by the second type of pixel point to an intensity of an optical signal received by the adjacent first type of pixel point can eliminate the effect of the environment factor to a certain extent; in this way, the ratio that eliminates the effect of the environment factor can significantly reflect optical characteristics of a material of a target object; and further, whether the target object is a real finger is determined according to the ratio, which can improve accuracy of live body detection.

It should be understood that, in the embodiment of the present application, fingerprint information of the target object may be determined without using a sampling value of the second type of pixel point; and in this case, the sampling value of a position of the second type of pixel point may be determined by a sampling value of the adjacent first type of pixel point, for example, the sampling value of the second type of pixel point is obtained by performing interpolation or fitting processing on the sampling value of the adjacent first type of pixel point.

Optionally, in the embodiment of the present application, the sampling value of the second type of pixel point may also be used to determine the fingerprint information of the target object; due to the principle of optical imaging, a pixel point at a central position of a fingerprint detection area usually enters a saturation region early, and by disposing the second type of pixel point at the central position of the pixel array, it is beneficial for preventing a sampling value of the central position from entering the saturation region early, thereby improving the sampling value of the pixel point at the central region.

Optionally, in same embodiments, the processor 220 is specifically configured to:

determine a relative light intensity of each second type of pixel point according to an intensity of the optical signal received by the each second type of pixel point and an intensity of the optical signal received by at least one adjacent first type of pixel point; and determine whether the object is a real finger according to the relative light intensity of the each second type of pixel point and a relative light intensity range.

As an embodiment, the relative light intensity of the second type of pixel point may be a ratio of an intensity of an optical signal received by the second type of pixel point to an intensity of an optical signal received by one adjacent first type of pixel point; or a plurality of ratios of the intensity of the optical signal received by the second type of pixel point to intensities of optical signals of a plurality of adjacent first type of pixel points may be determined, and the relative light intensity of the second type of pixel point is determined according to the plurality of ratios, for example, a maximum value, a minimum value, or an average value of the plurality of ratios can be determined as the relative intensity of the second type of pixel point.

A second type of pixel point is P2, an intensity of a detected optical signal is S2, a first type of pixel points adjacent to the second type of pixel point include P11, P12 and P13, intensities of optical signals detected by them are S11, S12 and S13, respectively, and a relative intensity of P2 may be any one of S2/S11, S2/S12 and S2/S13; or the relative intensity of P2 may also be a maximum value, a minimum value, or an average value of S2/S11, S2/S12 and S2/S13.

As another embodiment, a maximum value, a minimum value, or an average value of intensities of optical signals received by a plurality of first type of pixel points adjacent to the second type of pixel point can be first determined, and then a ratio of the intensity of the optical signal received by the second type of pixel point to the maximum value, the minimum value or the average value of the intensities of the optical signals received by the plurality of adjacent first type of pixel points is determined as the relative light intensity of the second type of pixel point.

By following the previous example, a relative intensity RS of the second type of pixel point P2 may be S2/max(S11+S12+S13), S2/min(S11+S12+S13) or S2/avg(S11+S12+S13), where max, min and avg represent taking a maximum value, a minimum value and an average value, respectively.

It should be understood that the foregoing manners for determining the relative light intensity of the second type of pixel point are only exemplary, the processor may also determine the relative light intensity of the second type of pixel point according to other formulas as long as a difference between the intensity of the optical signal collected by the second type of pixel point and an intensity of an optical signal collected by the same genre of an adjacent first type of pixel point can be reflected, and this is not limited in the embodiment of the present application.

Therefore, the relative light intensity of the second type of pixel point can be used to characterize a degree of reduction (or a degree of attenuation) of the intensity of the optical signal received by the second type of pixel point relative to the intensity of the optical signal received by the adjacent first type of pixel point. For different materials, the degree of reduction has a significant difference, that is, a real finger corresponds to a specific relative light intensity range, and for artificial materials, the relative light intensity of the second type of pixel point is not within the relative light intensity range; therefore, whether the object is a real finger can be determined according to whether the relative light intensity of the second type of pixel point is within the relative light intensity range.

In an optional implementation, the processor may determine a number (or referred to as a matching number) of second type of pixel points of which relative light intensities are within the relative light intensity range, and further determine whether the object is a real finger according to the number. For example, the processor may determine that the object is a real finger when the number is greater than a specific number threshold, otherwise, the object is determined to be a fake finger; alternatively, the processor may also determine that the object is a real finger when a ratio (or referred to as a matching ratio) of the number to a total number of the second type of pixel points is greater than or equal to a specific ratio threshold, otherwise, the object is determined to be a fake finger.

Optionally, in some embodiments, a security level of an operation of triggering fingerprint identification may be set, for example, an unlocking operation for a terminal device may be set to a low security level, an operation such as payment may be set to a high security level, and further, different specific number thresholds or specific ratio thresholds can be set for different security levels, that is, a first correspondence relationship between a security level and a specific number threshold or a specific ratio threshold can be determined, so that the processor can determine the specific number threshold or the specific ratio threshold according to the security level of the operation of triggering the fingerprint identification in conjunction with the first correspondence relationship.

For example, a high security level corresponds to a first number threshold or a first ratio threshold, and a low security level corresponds to a second number threshold or a second ratio threshold; thus, the first number threshold may be set to be greater than the second number threshold, and the first ratio threshold may be set to be greater than the second ratio threshold. By setting that the high security level corresponds to a higher matching number or matching ratio, it is beneficial for improving security of fingerprint identification; and by setting that the low security level corresponds to a lower matching number or matching ratio, it is beneficial for reducing a false rejection rate (FRR) and improving fingerprint identification speed.

Optionally, in some embodiments, different security levels may also be set to correspond to different relative light intensity ranges, that is, a second correspondence relationship between a security level and a relative light intensity range can be determined, for example, a relative light intensity range corresponding to a low security level may be set to be wider than a relative light intensity range corresponding to a high security level. For example, if the high security level corresponds to a first light intensity range and the low security level corresponds to a second light intensity range, an upper limit of the first light intensity range may be set to be less than an upper limit of the second light intensity range, and/or a lower limit of the first light intensity range may be set to be greater than a lower limit of the second light intensity range. By setting that the high security level corresponds to a narrower relative light intensity range, it is beneficial for improving security of fingerprint identification, and by setting that the low security level corresponds to a wider relative light intensity range, it is beneficial for reducing an FRR and improving fingerprint identification speed.

Optionally, in some embodiments, since reflective capabilities of a fingerprint ridge and a fingerprint valley are different, corresponding relative light intensity ranges may be configured for optical signals from a fingerprint ridge and from a fingerprint valley, respectively, so that the processor may determine a relative light intensity range according to a fingerprint ridge or a fingerprint valley where an optical signal received by the second type of pixel point comes from, and determine authenticity of a fingerprint according to the relative light intensity range.

Optionally, the relative light intensity range in the embodiment of the present application may be obtained by collecting a large number of fingerprint samples of a real finger and training them, which will be described in detail in the following method embodiment.

Optionally, in the embodiment of the present application, the processor may determine that fingerprint authentication is successful in a case that fingerprint information of the object that is collected by the fingerprint identification apparatus matches a registered fingerprint template of the object and the object is a real finger, and may further perform an operation of triggering the fingerprint identification, such as an operation of terminal unlocking or payment.

An operating principle of a fingerprint identification apparatus according to an embodiment of the present application will be described in conjunction with a transmission diagram of an optical signal shown in FIG. 3.

When an object 240 is placed on a fingerprint identification area (for example, the fingerprint detection area 103 in FIG. 1), optical signals 251, 255 and 253 emitted from a display screen 250 reach a fingerprint ridge 241 and a fingerprint valley 242, respectively, and reflected light 252, 256 and 254 are formed, respectively, where the reflected light 252 and 256 are from the fingerprint ridge 241, and the reflected light 254 is from the fingerprint valley 242. Generally, reflection of an optical signal from a fingerprint ridge is stronger, so an intensity of a reflected optical signal is greater, and reflection from a fingerprint valley is weaker, so the intensity of the reflected optical signal is less; and fingerprint images having a contrast of light and dark can be obtained after the reflected light 254 and 256 are received by first type of pixel points 211.

After the reflected light 252 passes through a color filter layer 222, a signal intensity thereof reduces relative to that of the reflected light 256, and a ratio of an intensity of the reflected light 252 received by a second type of pixel point 212 to an intensity of the reflected light 256 received by the first type of pixel point 211 can be determined; for a real finger, the ratio may fluctuate within a specific light intensity range, however, for an artificial material such as silica gel, paper and adhesive tape, the ratio is not within the foregoing light intensity range due to different reflection performance to skin tissue; therefore, whether the object 240 is a real finger can be determine according to whether the ratio is within the light intensity range. For example, if the light intensity range is [0.65, 0.75], and if determined relative light intensities of a plurality of second type of pixel points are about 0.5, it can be considered that the object 240 is a fake finger.

Optionally, in the embodiment of the present application, a fingerprint identification apparatus 20 may further include a driving module and a signal reading module, and the driving module and the signal reading module may be connected to a pixel array 210 via inner wires, where the driving module is configured to control row-wise scanning of the pixel array 210, and the signal reading module may be configured to process signals detected by the pixel array 210, such as, amplification and analog-to-digital conversion (ADC), and further transmit the processed signals to a processor 220; optionally, the signal reading module and the processor 220 can be connected through a flexible circuit board (Flexible Printed Circuit, FPC).

The apparatus embodiments of the present application are described above in detail in conjunction with FIG. 2 to FIG. 3, and method embodiments of the present application are described below in detail in conjunction with FIG. 4 to FIG. 6; and it should be understood that the method embodiments and the apparatus embodiments correspond to each other, and similar description may refer to the description of the apparatus embodiments.

Figure 4:
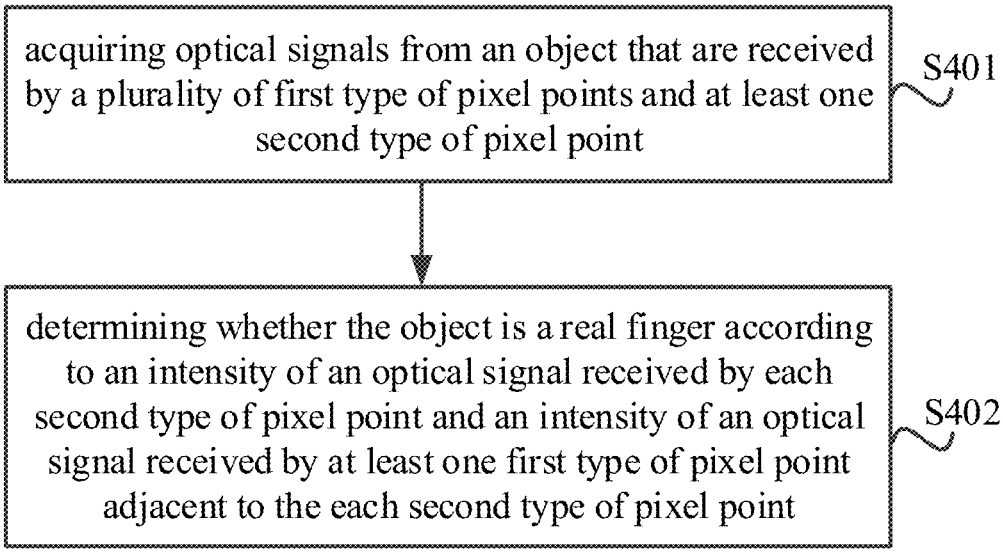
FIG. 4 is a schematic flowchart of a method of fingerprint identification according to an embodiment of the present application.

FIG. 4 is a schematic flowchart of a method of fingerprint identification according to an embodiment of the present application; it should be understood that a method 400 may be applied to the fingerprint identification apparatus 20 shown in FIG. 2; and particularly, the method 400 may be execute by a processor in the fingerprint identification apparatus, and as shown in FIG. 4, the method 400 includes:

S401, acquiring optical signals from an object that are received by a plurality of first type of pixel points and at least one second type of pixel point; and S402, determining whether the object is a real finger according to an intensity of an optical signal received by each second type of pixel point and an intensity of an optical signal received by at least one first type of pixel point adjacent to the each second type of pixel point.

Optionally, in some embodiments, S402 may specifically include:

determining a relative light intensity of the each second type of pixel point according to the intensity of the optical signal received by the each second type of pixel point and the intensity of the optical signal received by the at least one adjacent first type of pixel point; and determining whether the object is a real finger according to the relative light intensity of the each second type of pixel point and a relative light intensity range.

Optionally, in some embodiments, the determining the relative light intensity of the each second type of pixel point according to the intensity of the optical signal received by the each second type of pixel point and the intensity of the optical signal received by the at least one adjacent first type of pixel point, includes:

determining at least one ratio of the intensity of the optical signal received by the each second type of pixel point to the intensity of the optical signal received by the at least one adjacent first type of pixel point as the relative light intensity of the each second type of pixel point.

Optionally, in some embodiments, the determining whether the object is a real finger according to the relative light intensity of the each second type of pixel point and the relative light intensity range, includes:

determining a number of second type of pixel points of which relative light intensities are within the relative light intensity range; and determining whether the object is a real finger according to the number.

Optionally, in some embodiments, the determining whether the object is a real finger according to the number, includes:

determining that the object is a real finger if the number is greater than or equal to a specific number threshold, or a ratio of the number to a total number of the second type of pixel points is greater than or equal to a specific ratio threshold; or determining that the object is a fake finger if the number is less than the specific number threshold, or the ratio of the number to the total number of the second type of pixel points is less than the specific ratio threshold.

Optionally, in some embodiments, the method 400 further includes:

determining the specific ratio threshold or the specific number threshold according to a security level of an operation of triggering fingerprint identification and a first correspondence relationship, where the first correspondence relationship is a correspondence relationship between a security level and a ratio threshold or a specific number threshold.

Optionally, in the first correspondence relationship, a first security level corresponds to a first ratio threshold or a first number threshold, and a second security level corresponds to a second ratio threshold or a second number threshold, where the first security level is higher than the second security level, the first ratio threshold is greater than the second ratio threshold, and the first number threshold is greater than the second number threshold.

Optionally, in some embodiments, the method further includes:

determining the relative light intensity range according to a security level of an operation of triggering fingerprint identification and a second correspondence relationship, where the second correspondence relationship is a correspondence relationship between a security level and a relative light intensity range.

Optionally, in the second correspondence relationship, a first security level corresponds to a first light intensity range, and a second security level corresponds to a second light intensity range, where the first security level is higher than the second security level, a difference value between an upper limit and a lower limit of the first light intensity range is less than a difference value between an upper limit and a lower limit of the second light intensity range.

Optionally, in some embodiments, the method 400 further includes:

determining the relative light intensity range according to a finger position where the optical signal received by the second type of pixel point comes from, where the finger position includes a fingerprint ridge and a fingerprint valley that respectively correspond to different intensity ranges.

Optionally, in some embodiments, the method 400 further includes:

determining the relative light intensity range according to optical signals from a plurality of real fingers that are collected by the plurality of first type of pixel points and the at least one second type of pixel point.

For a user being performed fingerprint identification on for the first time, it is required to perform collection and recording of fingerprint information, and a process of determining the relative light intensity range can be implemented in a process of recording a fingerprint. As shown in FIG. 5, it may specifically include the following steps:

S301, collecting optical signals reflected from a user finger multiple times by a common pixel point and a characteristic pixel point in a pixel array of a fingerprint identification apparatus, where the optical signals collected by the common pixel point can be used to determine fingerprint information of the user, while a plurality of ratios of intensities of optical signals collected by each characteristic pixel point to intensities of optical signals collected by an adjacent common pixel point can be determined, and the plurality of ratios can be used to determine the foregoing relative light intensity range.

Since the optical signals detected by the characteristic pixel point may come from a fingerprint ridge, or may come from a fingerprint valley, relative light intensity ranges respectively corresponding to the two cases can be determined.

In the embodiment of the present application, fingerprint collection may be performed on a large number of real fingers by the common pixel point and the characteristic pixel point in the pixel array of the fingerprint identification apparatus, so as to determine the relative light intensity range, and the large number of real fingers may come from a same user, or may come from a plurality of different users.

Further, in S302, the relative light intensity range may be determined according to the plurality of ratios obtained in S301.

Optionally, machine learning may be performed on the plurality of ratios, or training may be performed on sampling data of the plurality of ratios by a convolutional neural network to determine the relative light intensity range.

Figure 6:
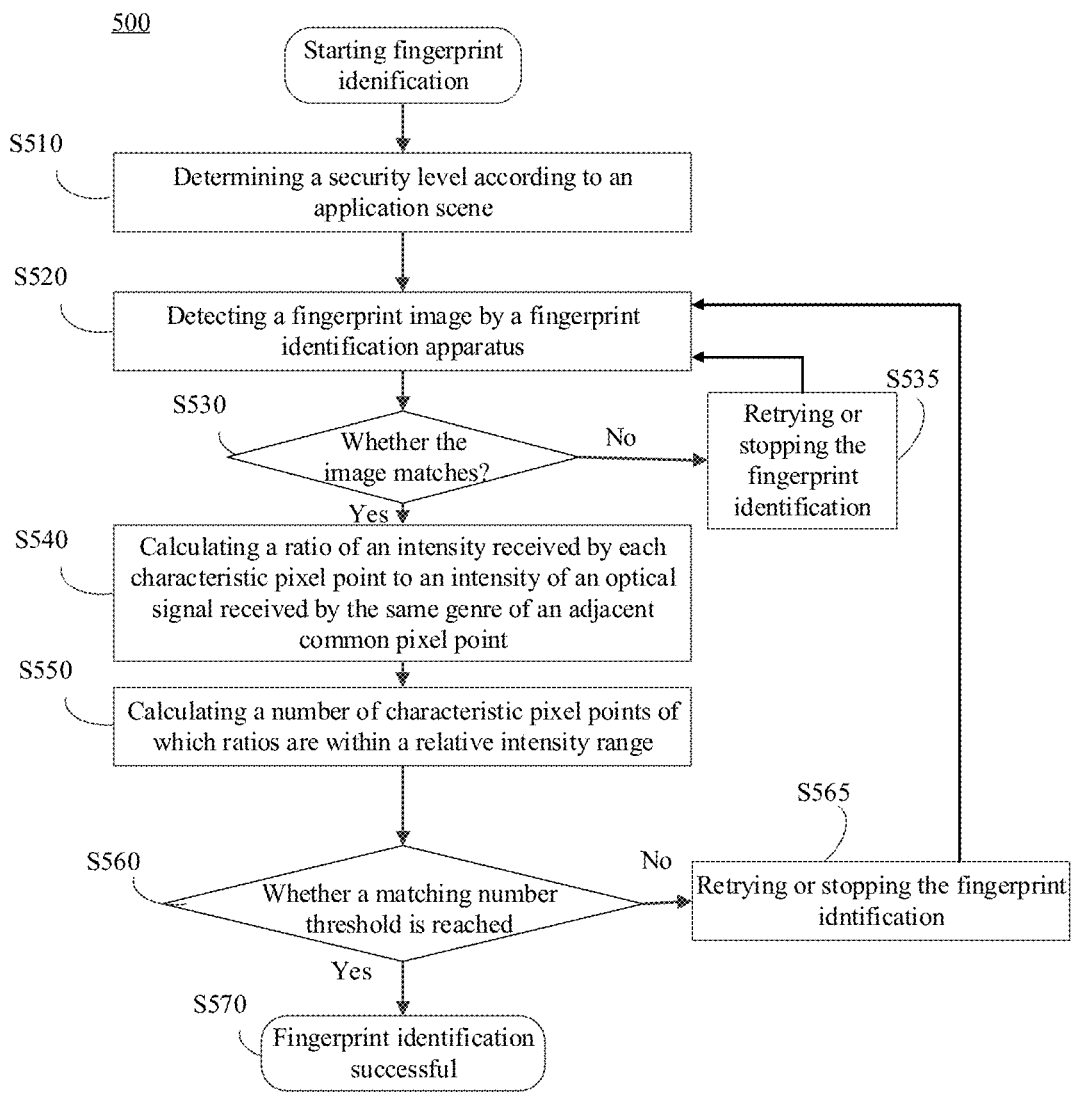
FIG. 6 is an entire flowchart of a method of fingerprint identification according to an embodiment of the present application.

After the determination of the fingerprint information recorded by the user and the relative light intensity range, a subsequent process of fingerprint authentication (that is, fingerprint identification) will be illustrated in conjunction with FIG. 6. It may specifically include the following steps:

S510, a security level is determined according to an application scene; and particularly, the application scene may include a terminal unlocking scene, a payment scene and the like, different application scenes may correspond to different security levels, fingerprint identification algorithms corresponding to different security levels are different, particularly, different security levels correspond to different relative light intensity ranges, matching number thresholds, matching ratio thresholds or the like, and for a specific implementation, reference may be made to the related description of the foregoing embodiments.

S520, a fingerprint identification apparatus detects a fingerprint image of an object on a fingerprint identification area.

S530, whether the fingerprint image matches a recorded fingerprint image of the object is determined.

If it matches, S540 is executed, otherwise, S535 is executed, that is, a user is indicated that fingerprint identification fails, or the user is prompted to perform fingerprint input again, and the flow proceeds to S520.

In S540, a ratio of an intensity of an optical signal received by each characteristic pixel point to an intensity of an optical signal received by the same genre of an adjacent common pixel point is calculated, that is, the foregoing relative light intensity of the second type of pixel point.

Further, in S550, a number of characteristic pixel points of which ratios are within a relative light intensity range is determined according to the relative light intensity range and the matching number threshold corresponding to the security level determined in 510.

In S560, whether the number reaches the matching number threshold is determined.

If it reaches, S570 is executed, that is, it is determined that fingerprint authentication is successful, otherwise, S565 is executed, that is, indicating the user that the fingerprint identification fails, or prompting the user to perform fingerprint input again, and the flow proceeds to S520.

Therefore, in the embodiment of the present application, the fingerprint identification apparatus can determine that fingerprint authentication is successful in a case that fingerprint information of the object matches pre-stored fingerprint information of the object and the object is a real finger, which can improve security of the fingerprint identification.

It should be understood that the foregoing process of fingerprint identification is merely exemplary; in the embodiment of the present application, it is also possible that whether the object is a real finger is determined first, and then whether fingerprint information of the object matches recorded fingerprint information of the object is determined in a case that the object is a real finger; and it is determined that fingerprint authentication is successful in a case that the foregoing two conditions are met at the same time, and an operation of triggering the fingerprint identification is further performed, such as an operation of terminal unlocking or payment.

It should be understood that, in the method embodiments of the present application, values of sequence numbers of the foregoing various processes do not mean an order of execution which should be determined based upon functionalities and internal logics thereof, rather than constitute any limit to implementation of the embodiments of the present application.

Figure 5:
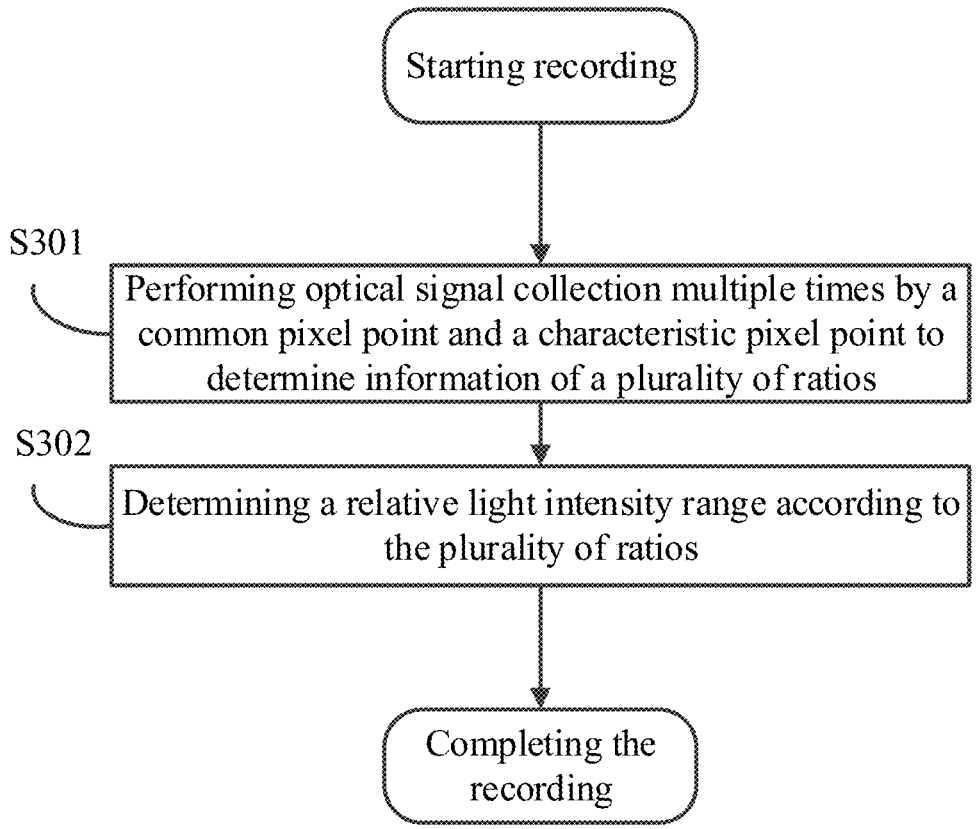
FIG. 5 is a schematic flowchart of a fingerprint recording process according to another embodiment of the present application.
Figure 7:
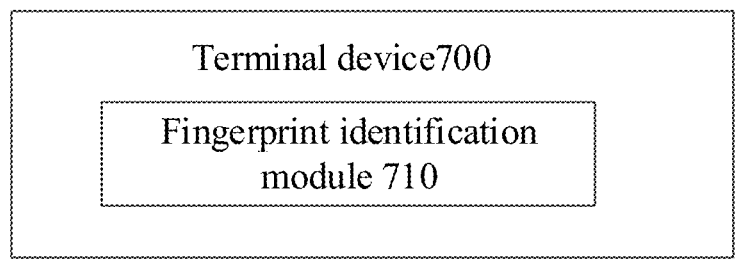
FIG. 7 is a schematic block diagram of a terminal device according to an embodiment of the present application.

As shown in FIG. 7, an embodiment of the present application further provides a terminal device 700, the terminal device 700 may include a fingerprint identification apparatus 710, and the fingerprint identification apparatus 710 may be the fingerprint identification apparatus 20 in the foregoing apparatus embodiments, which can be configured to perform contents in the method embodiments in FIG. 4 to FIG. 6.

It should be understood that the processor of the embodiments of the present application may be an integrated circuit chip with a signal processing capability. In an implementation process, steps of the foregoing method embodiments may be completed by using an integrated logical circuit of hardware in the processor or an instruction in a form of software. The foregoing processor may be a general purpose processor, a digital signal processor (DSP), an application specific integrated circuit (ASIC), a field programmable gate array (FPGA) or another programmable logic device, a discrete gate or a transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage media in the art, such as a random access memory, a flash memory, a read-only memory, a programmable read-only memory or an electrically erasable programmable memory, a register. The storage medium is located in the memory, and the processor reads information in the memory and completes the steps in the foregoing methods in combination with hardware of the processor.

It may be understood that the fingerprint identification apparatus in the embodiments of the present application may further include a memory, and the memory may be a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this paper aims to include but is not limited to these memories and any memory of another proper type.

An embodiment of the present application further provides a computer readable storage medium, the computer readable storage medium stores one or more programs, and the one or more programs include an instruction; and when the instruction is executed by a portable electronic device that includes a plurality of application programs, the portable electronic device is enabled to execute the methods of the embodiments shown in FIG. 4 to FIG. 6.

An embodiment of the present application further provides a computer program, and the computer program includes instructions that, when executed by a computer, cause the computer to execute the methods of the embodiments shown in FIG. 4 to FIG. 6.

An embodiment of the present application further provides a chip, the chip includes an input/output interface, at least one processor, at least one memory and a bus, where the at least one memory is configured to store instructions, the at least one processor is configured to call the instructions in the at least one memory to execute the methods of the embodiments shown in FIG. 4 to FIG. 6.

Those of ordinary skill in the art may be aware that, units and algorithm steps of the examples described in the embodiments disclosed in this paper may be implemented by electronic hardware, computer software, or a combination of the two. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. A fingerprint identification apparatus, being arranged under a display screen of a terminal device to implement under-display optical fingerprint detection and comprising:
   an optical sensor comprising a pixel array, wherein the pixel array comprises a plurality of first type of pixel points and at least one second type of pixel point, and the plurality of first type of pixel points and the at least one second type of pixel point are configured to receive optical signals from an object;
   a color filter layer or a polarizer plate disposed above the at least one second type of pixel point; and
   a processor configured to:
      determine a relative light intensity of the each second type of pixel point according to the intensity of the optical signal received by the each second type of pixel point and the intensity of the optical signal received by the at least one adjacent first type of pixel point; and
      determine whether the object is a real finger according to the relative light intensity of the each second type of pixel point and a relative light intensity range.

2. The fingerprint identification apparatus according to claim 1, wherein the processor is specifically configured to:
   determine at least one ratio of the intensity of the optical signal received by the each second type of pixel point to the intensity of the optical signal received by the at least one adjacent first type of pixel point as the relative light intensity of the each second type of pixel point;
   determine a number of second type of pixel points of which relative light intensities are within the relative light intensity range; and
   determine whether the object is a real finger according to the number.

3. The fingerprint identification apparatus according to claim 2, wherein the processor is further configured to:
   determine that the object is a real finger if the number is greater than or equal to a specific number threshold, or a ratio of the number to a total number of the second type of pixel points is greater than or equal to a specific ratio threshold; or
   determine that the object is a fake finger if the number is less than the specific number threshold, or the ratio of the number to the total number of the second type of pixel points is less than the specific ratio threshold.

4. The fingerprint identification apparatus according to claim 3, wherein the processor is further configured to:
   determine the specific ratio threshold or the specific number threshold according to a security level of an operation of triggering fingerprint identification and a first correspondence relationship, wherein the first correspondence relationship is a correspondence relationship between a security level and a ratio threshold or a specific number threshold;

wherein in the first correspondence relationship, a first security level corresponds to a first ratio threshold or a first number threshold, and a second security level corresponds to a second ratio threshold or a second number threshold, wherein the first security level is higher than the second security level, the first ratio threshold is greater than the second ratio threshold, and the first number threshold is greater than the second number threshold.

5. The fingerprint identification apparatus according to claim 1, wherein the processor is further configured to:
determine the relative light intensity range according to a security level of an operation of triggering fingerprint identification and a second correspondence relationship, wherein the second correspondence relationship is a correspondence relationship between a security level and a relative light intensity range;
wherein in the second correspondence relationship, a first security level corresponds to a first light intensity range, and a second security level corresponds to a second light intensity range, wherein the first security level is higher than the second security level, a difference value between an upper limit and a lower limit of the first light intensity range is less than a difference value between an upper limit and a lower limit of the second light intensity range.

6. The fingerprint identification apparatus according to claim 5, wherein the processor is further configured to:
determine the relative light intensity range according to a finger position where the optical signal received by the second type of pixel point comes from, wherein a fingerprint ridge and a fingerprint valley respectively correspond to different relative light intensity ranges; or,
determine the relative light intensity range according to intensities of optical signals from a real finger that are collected multiple times by the plurality of first type of pixel points and the at least one second type of pixel point.

7. The fingerprint identification apparatus according to claim 1, wherein the color filter layer is a color filter material, and a wave band range of the color filter material only comprises a part of a wave band range of an optical signal for fingerprint identification; wherein the color filter material comprises at least one of the following materials:
a green filter material, a blue filter material or a red filter material.

8. The fingerprint identification apparatus according to claim 1, wherein the optical signals received by the second type of pixel point and the adjacent first type of pixel point are from a fingerprint ridge or from a fingerprint valley.

9. A method of fingerprint identification, applied to a fingerprint identification apparatus being arranged under a display screen of a terminal device to implement under-display optical fingerprint detection and comprising an optical sensor, wherein a pixel array comprised in the optical sensor comprises a plurality of first type of pixel points and at least one second type of pixel point, a color filter layer or a polarizer plate is disposed above the at least one second type of pixel point, and the method comprises:
acquiring optical signals from an object that are received by the plurality of first type of pixel points and the at least one second type of pixel point;
determining a relative light intensity of the each second type of pixel point according to the intensity of the optical signal received by the each second type of pixel point and the intensity of the optical signal received by the at least one adjacent first type of pixel point; and
determining whether the object is a real finger according to the relative light intensity of the each second type of pixel point and a relative light intensity range.

10. The method according to claim 9, wherein the determining the relative light intensity of the each second type of pixel point according to the intensity of the optical signal received by the each second type of pixel point and the intensity of the optical signal received by the at least one adjacent first type of pixel point, comprises:
determining at least one ratio of the intensity of the optical signal received by the each second type of pixel point to the intensity of the optical signal received by the at least one adjacent first type of pixel point as the relative light intensity of the each second type of pixel point.

11. The method according to claim 9, wherein the determining whether the object is a real finger according to the relative light intensity of the each second type of pixel point and the relative light intensity range, comprises:
determining a number of second type of pixel points of which relative light intensities are within the relative light intensity range; and
determining whether the object is a real finger according to the number;
wherein the object is determined as a real finger if the number is greater than or equal to a specific number threshold, or a ratio of the number to a total number of the second type of pixel points is greater than or equal to a specific ratio threshold; or
the object is determined as a fake finger if the number is less than the specific number threshold, or the ratio of the number to the total number of the second type of pixel points is less than the specific ratio threshold.

12. The method according to claim 11, wherein the method further comprises:
determining the specific ratio threshold or the specific number threshold according to a security level of an operation of triggering fingerprint identification and a first correspondence relationship, wherein the first correspondence relationship is a correspondence relationship between a security level and a ratio threshold or a specific number threshold; wherein in the first correspondence relationship, a first security level corresponds to a first ratio threshold or a first number threshold, and a second security level corresponds to a second ratio threshold or a second number threshold, wherein the first security level is higher than the second security level, the first ratio threshold is greater than the second ratio threshold, and the first number threshold is greater than the second number threshold.

13. The method according to claim 9, wherein the method further comprises:
determining the relative light intensity range according to a security level of an operation of triggering fingerprint identification and a second correspondence relationship, wherein the second correspondence relationship is a correspondence relationship between a security level and a relative light intensity range;
wherein in the second correspondence relationship, a first security level corresponds to a first light intensity range, and a second security level corresponds to a second light intensity range, wherein the first security level is higher than the second security level, a difference value between an upper limit and a lower limit of the first light intensity range is less than a difference value between an upper limit and a lower limit of the second light intensity range.

14. The method according to claim 9, wherein the method further comprises:
   determining the relative light intensity range according to a finger position where the optical signal received by the second type of pixel point comes from, wherein a fingerprint ridge and a fingerprint valley respectively correspond to different relative light intensity ranges.

15. The method according to claim 9, wherein the method further comprises:
   determining the relative light intensity range according to intensities of optical signals from a real finger that are collected multiple times by the plurality of first type of pixel points and the at least one second type of pixel point.

16. The method according to claim 9, wherein the optical signals received by the second type of pixel point and the adjacent first type of pixel point are from a fingerprint ridge or from a fingerprint valley.

17. A terminal device, comprising:
   a display screen;
   a fingerprint identification apparatus arranged under the display screen to implement under-display optical fingerprint detection, wherein fingerprint identification apparatus comprises:
      an optical sensor comprising a pixel array, wherein the pixel array comprises a plurality of first type of pixel points and at least one second type of pixel point, and the plurality of first type of pixel points and the at least one second type of pixel point are configured to receive optical signals from an object; and
      a color filter layer or a polarizer plate disposed above the at least one second type of pixel point; and
   a processor configured to:
      determine a relative light intensity of the each second type of pixel point according to the intensity of the optical signal received by the each second type of pixel point and the intensity of the optical signal received by the at least one adjacent first type of pixel point; and
      determine whether the object is a real finger according to the relative light intensity of the each second type of pixel point and a relative light intensity range.

* * * * *